No. 775,764.

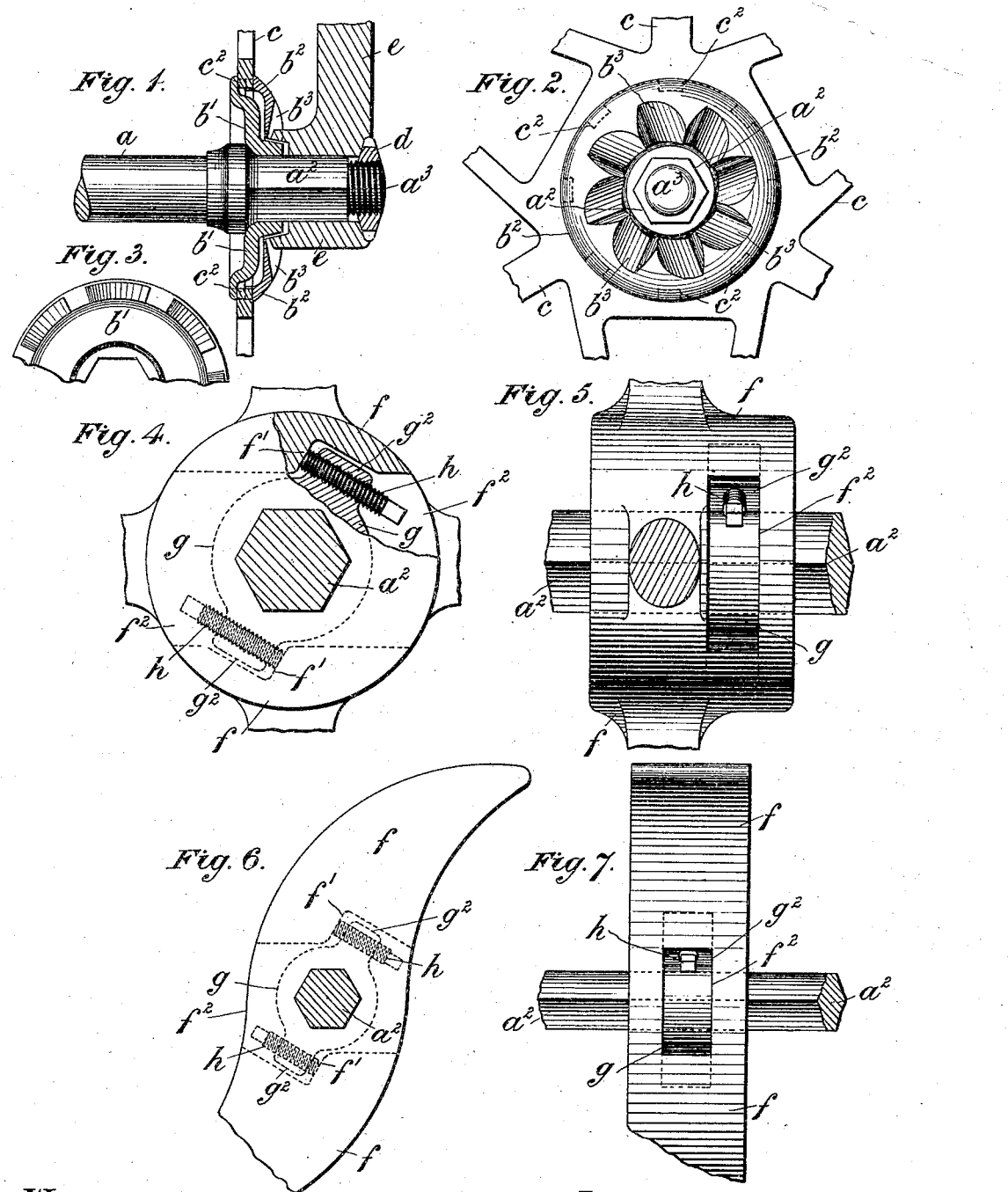

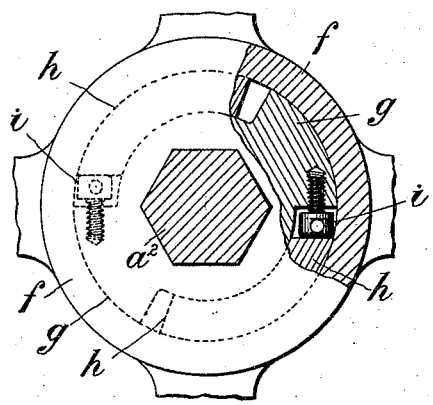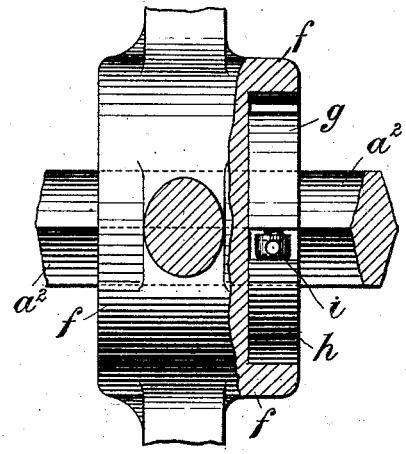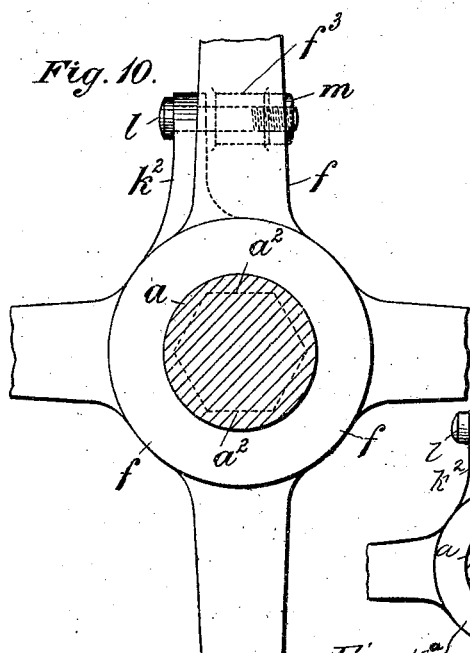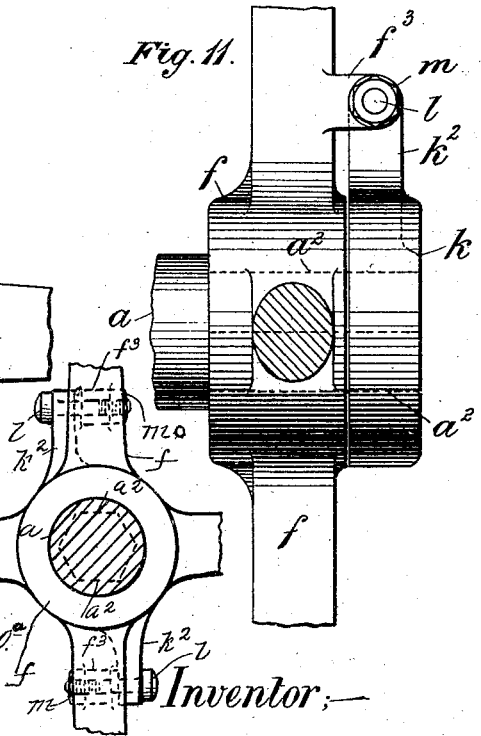

Patented November 22, 1904.

UNITED STATES PATENT OFFICE.

JOHN VERNON PUGH, OF ALLESLEY, NEAR COVENTRY, ENGLAND.

FASTENING FOR WHEELS, CRANKS, OR THE LIKE.

SPECIFICATION forming part of Letters Patent No. 775,764, dated November 22, 1904.

Application filed May 9, 1904. Serial No. 207,125. (No model.)

*To all whom it may concern:*

Be it known that I, JOHN VERNON PUGH, a subject of the King of Great Britain, residing at Guiting House, Allesley, near Coventry, England, have invented certain new and useful Improvements in Fastenings for Wheels, Cranks, or the Like, of which the following is a specification.

My invention consists of the improvements on or amplification hereinafter described of the "Fastenings for wheels and cranks," patented to me on September 1, 1903, No. 738,065.

In order that the present invention may be the better understood, I remark that the patented invention referred to consists of a member having grooves, a pair of members arranged thereon having ribs or keys extending into said grooves, and the combination therewith of means for giving the pair of members a slight rotative motion in opposite directions on the grooved member whereby the ribs or keys of one of the pair of members is made to bear forcibly on one side of the grooves while the ribs or keys of the other member bear forcibly on the other side of the grooves. In this way the ribbed or keyed members are securely locked on the grooved member, which may be a shaft, axle, spindle, or the like.

According to the present invention I dispense with the grooves in the shaft or member on which the wheel, crank, or the like is to be fixed. I make the said shaft or member of an irregular figure in cross-section or of any regular figure in cross-section other than circular. I make the hole in the boss of the wheel, crank, or the like of a figure corresponding with that of the cross-sectional figure of the shaft on which it is to be fixed, but of a size proper to fit easily thereon. A third member having a similar hole is placed on the shaft, and means are combined with the said arrangement tending to rotate the wheel, crank, or the like and third member in opposite directions on the shaft. In this way the wheel, crank, or the like and third member are wedged with such force on the shaft that their longitudinal motion thereon is rendered impossible.

In the description hereinafter given I have confined myself to an axle or shaft having a regular figure in cross-section other than circular—namely, a hexagonal figure; but I wish it to be understood that I do not limit myself to this figure, as any regular figure in cross-section other than circular or any irregular figure in cross-section may be employed with the same or nearly the same effect.

In Figures 1, 2, and 3 of the accompanying drawings I have represented my invention as applied to the fixing of the chain-wheel and crank to the crank-axle of a velocipede, Fig. 1 representing the chain-wheel and crank in vertical section on the hexagonal part near the end of the crank-axle, and Fig. 2 representing a side elevation of the parts before the crank and end-fixing nut are fitted on the axle. Fig. 3 is a side elevation of a portion of one of the parts of the construction shown in Figs. 1 and 2. Fig. 4 represents in end elevation, partly in section, my invention applied to the fixing of a fly-wheel or other wheel or pulley on its shaft; and Fig. 5 is a side elevation of the same. Figs. 6 and 7 represent my invention as applied to the fixing of one of the cams of a cam-stamp on its shaft. Figs. 8, 9, 10, 10$^a$, and 11 are modifications of my invention differing from the modification Figs. 4 and 5 only in respect of the means employed for forcing in opposite directions the two parts rotatively on the angular shaft.

The same letters of reference indicate the same parts in the several figures of the drawings.

Referring to Figs. 1, 2, and 3, $a$ is the crank-axle, (a portion only of which is represented,) having near its end the hexagonal part $a^2$, on which the chain-wheel $c$ and crank $e$ are to be fixed. The extreme end $a^3$ of the axle is screwed for the reception of the screw-nut $d$, by which the parts are tightened and secured on the crank-axle. To permit of the use of various sizes of chain-wheels, I prefer to employ a pair of chain-wheel-carrying plates $b'$ $b^2$, the hole in the plate $b'$ being of a size and shape proper to pass onto and fit easily the hexagonal part $a^2$ of the axle. The hole in the plate $b^2$ is circular and of a size proper to fit over the boss part of the plate $b'$. The chain-wheel $c$ has a series of inwardly-projecting teeth $c^2$. (Indicated in dotted lines in Fig. 2.) These teeth $c^2$ are gripped by oppositely-directed face ratchet-teeth on the presented edges of the two plates $b'$ $b^2$. The disposition of the chain-wheel-gripping ratchet-teeth of the plates $b'$ $b^2$ will be best understood by reference to the elevation of the outer face of a portion of the plate $b'$. (Shown in Fig. 3.) In the convex outer face of the plate $b^2$ a series of ratchet-like teeth $b^3$ are formed, against the more inclined sides of which similar but oppositely-directed teeth on the crank $e$ bear when the parts are tightened up by the screwing of the screw-nut $d$ on the end screw $a^3$. The action of such construction is similar to that of my former patent hereinbefore referred to—that is to say, by the screwing up of the screw-nut $d$ the more inclined sides of the teeth on the boss of the crank $e$ are forced on the more inclined sides of the teeth $b^3$ on the plate $b^2$, the crank $e$ is thereby forced rotatively in one direction on the hexagonal part $a^2$ of the axle $a$ until it becomes bound firmly thereon, and the plate $b^2$ is forced rotatively in the opposite direction on the boss part of the plate $b'$, and acting through the teeth $c^2$ of the chain-wheel $c$ it imparts a corresponding rotative movement to the plate $b'$, which becomes bound firmly on the shaft. Thus it will be understood that although the holes in the two parts fitted on the shaft are made of a size to permit of their easy passage thereon, the parts when tightened up are absolutely free from shakiness or backlash, and such construction provides a ready means of tightening to compensate for wear from time to time.

I wish it to be understood that I do not limit myself to the means described and represented of connecting the chain-wheel to the chain-wheel-carrying plates, as these may be varied without affecting the essential feature of the invention. Further, I do not limit myself to the use of chain-wheel-supporting plates, as the boss of the chain-wheel may be made internally of a size and shape proper to take directly on the hexagonal part $a^2$ of the crank-axle $a$ and be provided with ratchet-teeth on its outer side, as will be understood by reference to Figs. 1 and 2 of the specification of my former patent, No. 738,065.

Instead of effecting the slight rotation of the wheel on the axle by the ratchet-like teeth described and represented, other means may be employed for that purpose. For example, as illustrated in Figs. 4 and 5, in connection with the boss of an ordinary pulley or fly wheel $a$ slot $f^2$ may be made in the boss of the pulley or the like for the reception of a plate $g$, having a hole exactly similar to that in the boss of the pulley. The plate $g$ is formed with projections $g^2$ at opposite sides, each having a hole tapped for the reception of an adjusting-screw $h$, the ends of which screws bear against abutments $f'$ in the slots $f^2$. When the pulley $f$ with the plate $g$ in position is passed onto the hexagonal shaft $a^2$, the adjusting-screws $h$ are rotated in the direction proper for giving a slight rotative movement in opposite directions to the pulley $f$ and plate $g$, whereby the two parts are made to bind on the shaft with such force as to render their longitudinal or endwise motion impossible.

Figs. 6 and 7 represent a cam or wiper fixed to its shaft by the construction last described, the slot $f^2$ being made in the middle of the cam or wiper.

The constructions shown in Figs. 8 to 11, both inclusive, differ from those already described only in the means for imparting a rotative movement to the pulley, so as to effect the binding of the same on the shaft. In the construction shown in Figs. 8 and 9 the plate $g$, together with slightly-tapered or wedge-shaped curved plates $h$, are passed into a recess in one side or end of the boss $f$ of the pulley. The adjusting-screws $i$ $i$, carried by the plate $g$, have heads which bear against the wider ends of the wedge-shaped curved plates $h$. When the screws $i$ $i$ are rotated in the direction proper for unscrewing them out of the screw-holes in the plate $g$, the pulley $f$ and plate $g$ are forced rotatively in opposite directions on the shaft $a^2$. In the constructions shown in Figs. 10 and 11 a ring $k$ is suspended at one side of the pulley $f$ from a screw-bolt $l$, passed through an arm $k^2$ on the ring $k$ and through a lug $f^3$ on the pulley. By screwing the screw-nut $m$ on the screw-bolt $l$ the arm $k^2$ can be drawn toward the lug $f^3$ and the ring $k$ partially rotated on the shaft $a^2$ with respect to the pulley $f$. Where thought necessary or desirable the arm $k^2$ can be duplicated—that is to say, an arm at opposite sides of the ring $k$ can be used. (Shown in Fig. 10ᵃ.)

From the description hereinbefore given it will be understood that my invention is applicable to the fastening of any article which requires to be fixed on a shaft, axle, spindle, or the like.

Having now described my invention, what I claim as new, and desire to secure by Letters Patent, is—

In combination with a member having a cross-sectional figure other than that of a cylinder, a second member fitting on the first member, a third member also fitting on the first member, and means for giving rotative movement in opposite directions to the second and third members, so as to effectually bind them on the first member.

In testimony whereof I have hereunto set my hand in presence of two subscribing witnesses.

JOHN VERNON PUGH.

Witnesses:
RICHARD SKERRETT,
ARTHUR J. POWELL.